(12) United States Patent
Irizarry (10) Patent No.: US 12,443,956 B2
(45) Date of Patent: Oct. 14, 2025

(54) NFT OWNERSHIP AUTHENTICATION AND DISTRIBUTION

(71) Applicant: Gian Luis Irizarry, Carolina, PR (US)

(72) Inventor: Gian Luis Irizarry, Carolina, PR (US)

(73) Assignee: Gian Luis Irizarry, Carolina, PR (US)

( * ) Notice: Subject to any disclaimer, the term of this patent is extended or adjusted under 35 U.S.C. 154(b) by 133 days.

(21) Appl. No.: 18/315,499

(22) Filed: May 11, 2023

(65) Prior Publication Data

US 2024/0378606 A1    Nov. 14, 2024

(51) Int. Cl.
| | |
|---|---|
| G06Q 20/40 | (2012.01) |
| G06Q 10/02 | (2012.01) |
| G06Q 20/10 | (2012.01) |
| G06Q 20/36 | (2012.01) |
| G06Q 20/12 | (2012.01) |
| G06Q 30/018 | (2023.01) |
| H04L 9/00 | (2022.01) |

(52) U.S. Cl.
CPC .......... *G06Q 20/401* (2013.01); *G06Q 20/10* (2013.01); *G06Q 20/3672* (2013.01); *G06Q 10/02* (2013.01); *G06Q 2220/00* (2013.01)

(58) Field of Classification Search
CPC .. G06Q 20/401; G06Q 20/3672; G06Q 20/10; G06Q 10/02; G06Q 2220/00; G06Q 20/12; G06Q 20/1235; G06Q 30/0185; H04L 2209/56; H04L 9/50
USPC ......................................................... 705/66
See application file for complete search history.

(56) References Cited

U.S. PATENT DOCUMENTS

| | | | | |
|---|---|---|---|---|
| 2023/0092012 | A1* | 3/2023 | Matthews | .......... G06Q 20/0658 |
| 2023/0419306 | A1* | 12/2023 | Shulman | .......... G06Q 20/38215 |
| 2024/0185229 | A1* | 6/2024 | Dashkov | ............ G06Q 30/0207 |

FOREIGN PATENT DOCUMENTS

| | | | |
|---|---|---|---|
| CN | 113704702 A | * | 11/2021 |
| KR | 20230169769 A | * | 12/2023 |
| WO | WO-2023214596 A1 | * | 11/2023 |

OTHER PUBLICATIONS

* Venugopal et al. "NFT for Collectibles", 2023 International Conference on Nascent Technologies in Engineering (ICNTE2023), IEEE, Jun. 9, 2023, 5 pages discloses that the benefits of NFTs are the capacity to prove ownership (III)(D) and that they are verifiable (III)(F) (Year: 2023).*
English translation of Park et al. KR 20230169769A, Published Dec. 18, 2023 and filed on Jun. 9, 2022, 15 pages (Year: 2022).*

* cited by examiner

*Primary Examiner* — James D Nigh (57) ABSTRACT

The system will provide a method of authenticating the ownership of an NFT that has been assigned through a distributed ledger, with the creation of a unique QR Code that links the NFT and wallet address to the owner. This resolves the problem of authenticating NFT ownership in physical events or establishments without the user requiring the use of a wallet or internet connection. The system will also provide the distribution of an NFT through a distributed ledger to a user wallet address. The system will receive a payment confirmation that will follow the execution of the NFT transfer though the distributed ledger. The system will generate a unique QR code after the completion of the NFT transfer to the user wallet address. The system will send an email to the user containing the generated QR Code, linking the NFT to the wallet address of the user.

3 Claims, 10 Drawing Sheets

NFT OWNERSHIP AUTHENTICATION AND DISTRIBUTION

CITED REFERENCES

| Number | Title |
|---|---|
| U.S. Pat. No.-11,301,460-B2 | Platform for creating and using actionable non-fungible tokens (KNFT) |
| US-20220222246-A1 | PLATFORM FOR CREATING AND USING ACTIONABLE NON-FUNGIBLE TOKENS (KNFT) |

FIELD OF THE INVENTION

The current invention deals with providing a method for authenticating the ownership of an NFT through a ledger proxy system and the distribution of the NFT through a distributed ledger to a user wallet address.

TYPE OF SUBMISSION

Utility

BACKGROUND OF THE INVENTION

The current event ticketing industry has faced multiple challenges when it comes to counterfeit tickets and visibility to the secondary marketplace. As this market keeps increasing at a rapid pace with no signs of slowing down, more challenges will continue to emerge as the current infrastructure is not capable of solving the problems. Thousands of dollars keep getting lost with the sale of duplicate tickets and event creators have no instrument of authenticating or tracking each of the tickets that are sold in the secondary market.

The method disclosed describes the solution to the existing problems in the ticketing industry by the use of the NFT. Each ticket is easily traceable through the distributed ledger giving visibility to the event creators of the wallet address that currently owns it. Each NFT securely authenticated through the ledger proxy system avoiding duplicate tickets and eliminating counterfeits. The distributed ledger also provides the infrastructure to manage high volumes of ticket demand, reducing the existing ticketing hurtle that many traditional ticketing systems face.

DETAILED DESCRIPTION OF THE PREFERRED EMBODIMENTS

Figure 1:
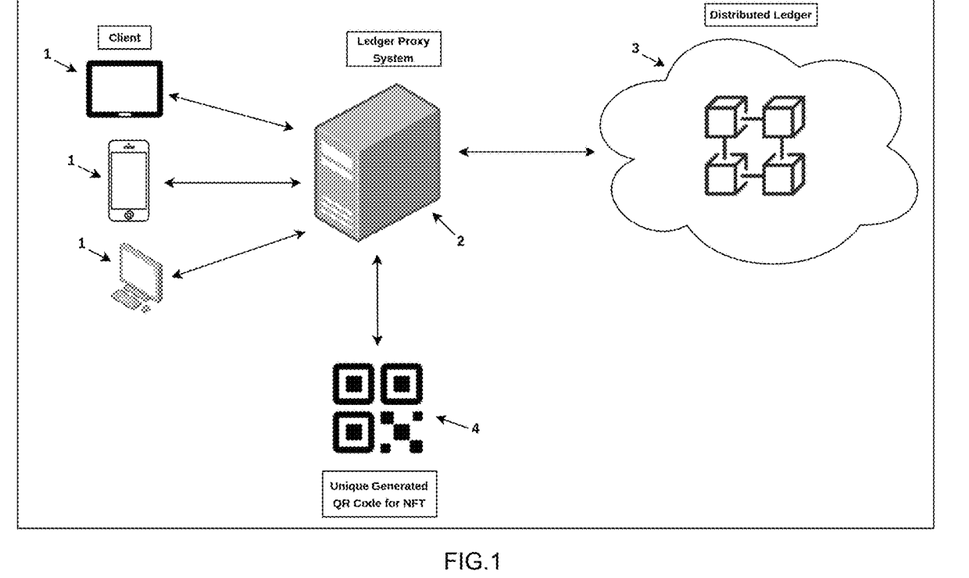
FIG. 1 Shows the user interaction with the ledger proxy system from a computer, tablet or mobile device. After validating the NFT ownership from the distributed ledger a unique QR Code is generated associating the NFT and user wallet address.

FIG. 1 Shows the interaction between the user and the system that authenticates the NFT ownership and generates a unique identifier. The system is accessed by the user through a computer device 1. The computer device 1 is composed of but not limited to a tablet, cell phone or personal computer. The computer device 1 connects to a ledger proxy system 2 that contains memory components and processing units. The ledger proxy system 2 will validate if the user wallet contains the NFT being evaluated by connecting to a distributed ledger 3. The distributed ledger 3 contains the NFT transaction history that the ledger proxy system 2 uses to validate NFT ownership from the user. When the NFT ownership has been validated the ledger proxy system 2 will generate a unique QR code 4. The unique QR code 4 that is linked to the NFT and user wallet, will be sent to the computer device 1 after ownership validation by the ledger proxy system 2.

Figure 2:
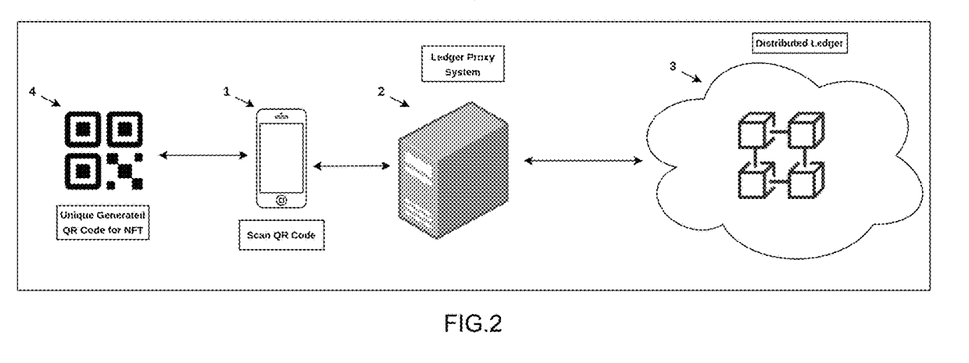
FIG. 2 Shows the interaction of a computer device scanning the unique generated QR Code to validate the ownership of the NFT in the distributed ledger through the ledger proxy system.

FIG. 2 Shows the process for authenticating and redeeming an NFT based on the unique QR code 4. The computer device 1 captures the image of the unique QR Code 4 that was generated by the ledger proxy system 2 in FIG. 1. The ledger proxy system 2 will process the data received from the computer device 1 and validate the authenticity. The ledger proxy system 2 will connect to the distributed ledger 3 to validate if the user wallet still contains the NFT being evaluated. When the NFT ownership has been validated the ledger proxy system 2 will send the result to the computer device 1.

Figure 3:
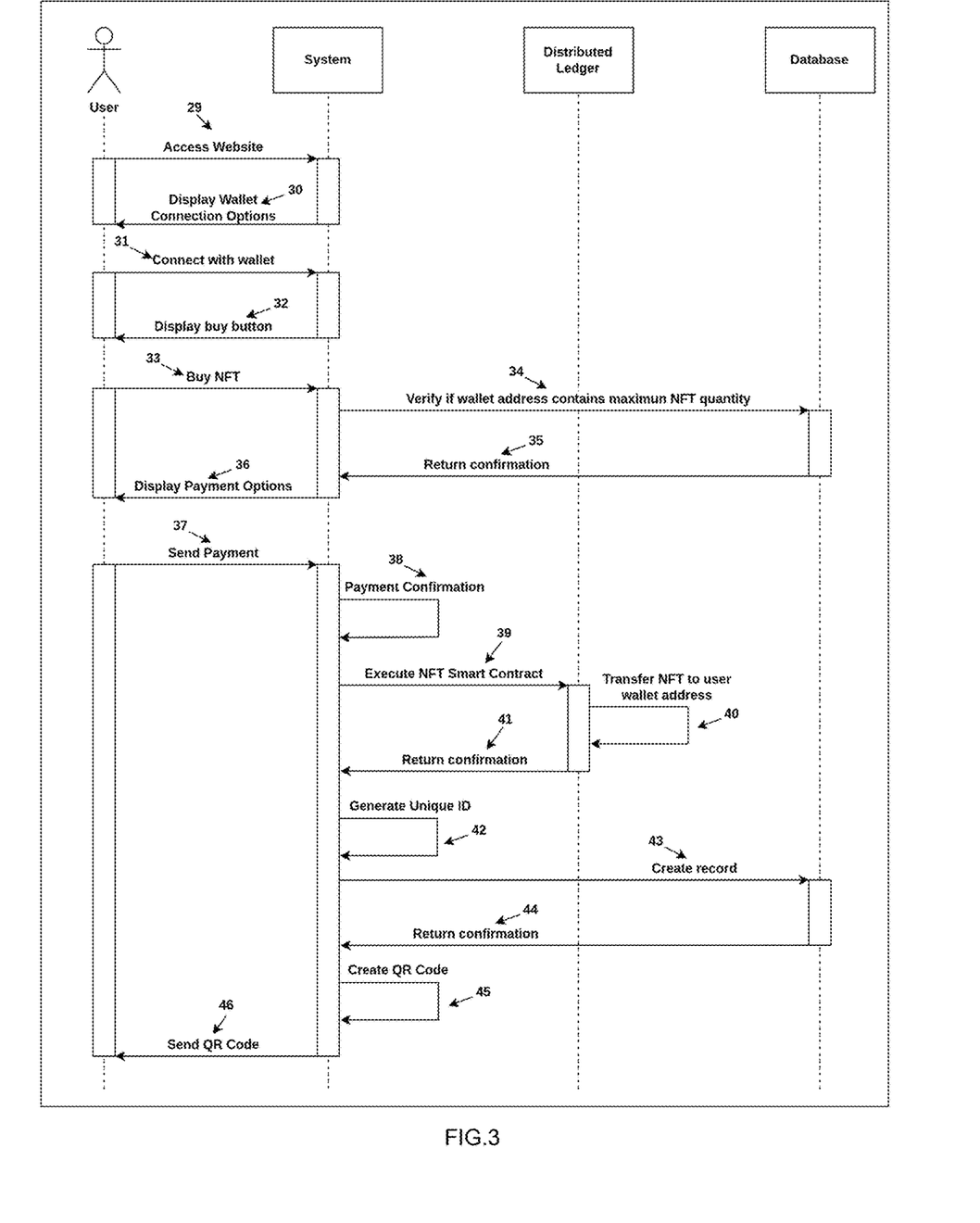
FIG. 3 Shows a sequence diagram of the user interaction with the system when purchasing an NFT and receiving the unique QR code.

FIG. 3 Shows a sequence diagram of the user interaction with the ledger proxy system 2 when purchasing an NFT and receiving the unique QR code 4. A step 29 is when the user first interacts with the ledger proxy system 2 connecting from the computer device 1. A step 30 follows step 29 where the ledger proxy system 2 displays multiple wallet connection options to the user. A step 31 follows step 30 after the user selects the connection option for the wallet that will receive the NFT. Once the ledger proxy system 2 connects to the user's wallet a step 32 will display the buy button to the user. A step 33 follows where the user clicks the buy button displayed from step 32. A step 34 continues to verify in the database if the user's wallet contains the maximum NFT quantity limit available to purchase. Once step 34 is finished a step 35 will return the confirmation to the ledger proxy system. A step 36 follows step 35 where the payment options are displayed to the user. After the user selects the payment option from step 36 a step 37 sends the payment information to the ledger proxy system. The ledger proxy system 2 will process the payment and a step 38 will generate the payment confirmation. When the payment confirmation is received a step 39 will interact with the smart contract in the distributed ledger. A step 40 follows step 39 that will send the NFT to the user's wallet selected from step 31. Once step 40 finishes the NFT transaction in the distributed ledger a step 41 will send the confirmation to the ledger proxy system. A step 42 follows step 41 that will generate a unique identifier. A step 43 will use this unique identifier to insert a record in the database. Once step 43 finishes a step 44 will send the record creation confirmation to the ledger proxy system. A step 45 follows step 44 to create the unique QR code 4 linking the user's wallet and NFT. A step 46 will send the unique QR code 4 that was created in step 45 to the user.

Figure 4:
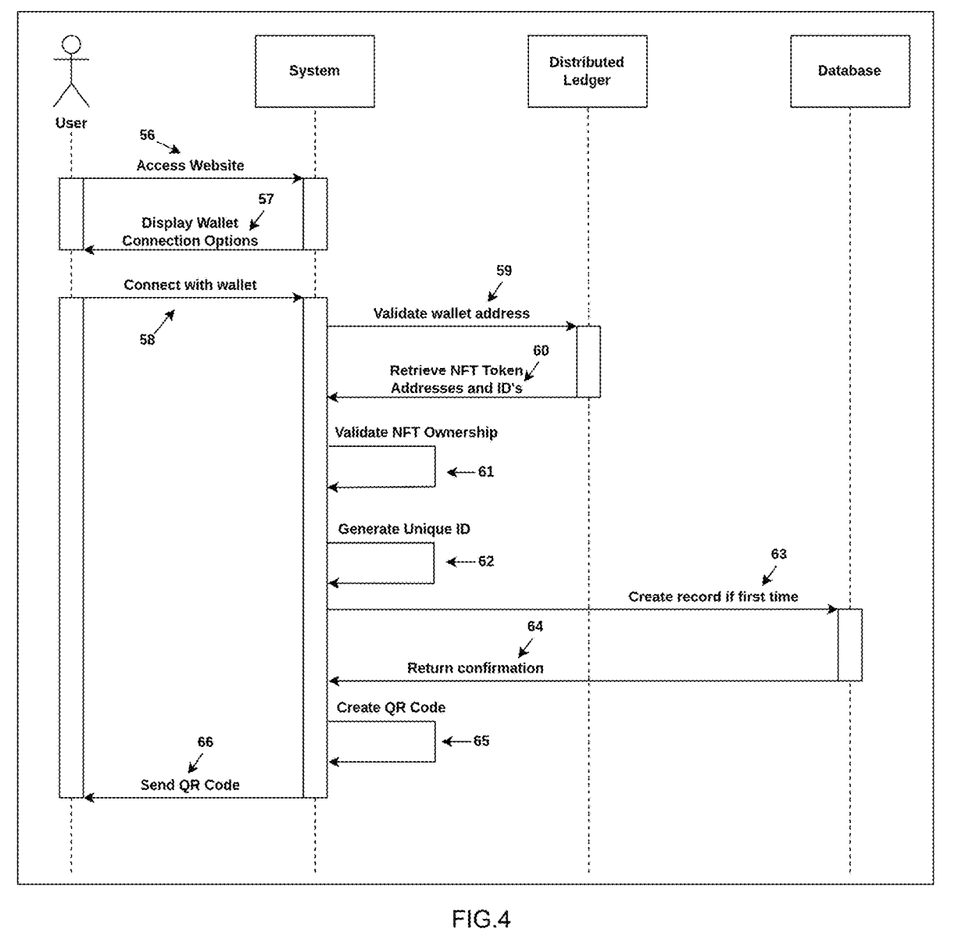
FIG. 4 Shows a sequence diagram of the user interaction with the system for the creation of the QR Code that links the NFT and wallet address to the user.

FIG. 4 Shows a sequence diagram of the user interaction with the ledger proxy system 2 for the creation of the unique QR code 4 that links the NFT and wallet address to the user. A step 56 is when the user first interacts with the ledger proxy system 2 connecting from the computer device 1. A step 57 follows step 56 where the ledger proxy system 2 displays multiple wallet connection options to the user. A step 58 follows step 57 after the user selects the connection option for the wallet that the new unique QR code 4 will be generated. Once the ledger proxy system 2 connects to the user's wallet a step 59 will validate if the wallet address connected exists in the distributed ledger. A step 60 follows step 59 where all the user NFT addresses and IDs will be retrieved from the distributed ledger. A step 61 follows step 60 where the NFT ownership will be evaluated. Once step 61 concludes the NFT ownership evaluation a step 62 will generate a unique identifier. A step 63 will use this unique identifier to insert a record in the database. Once step 63 finishes a step 64 will send the record creation confirmation to the ledger proxy system 2. A step 65 follows step 64 to create the unique QR code 4 linking the user's wallet and NFT. A step 66 will send the unique QR code 4 that was created in step 65 to the user.

Figure 5:
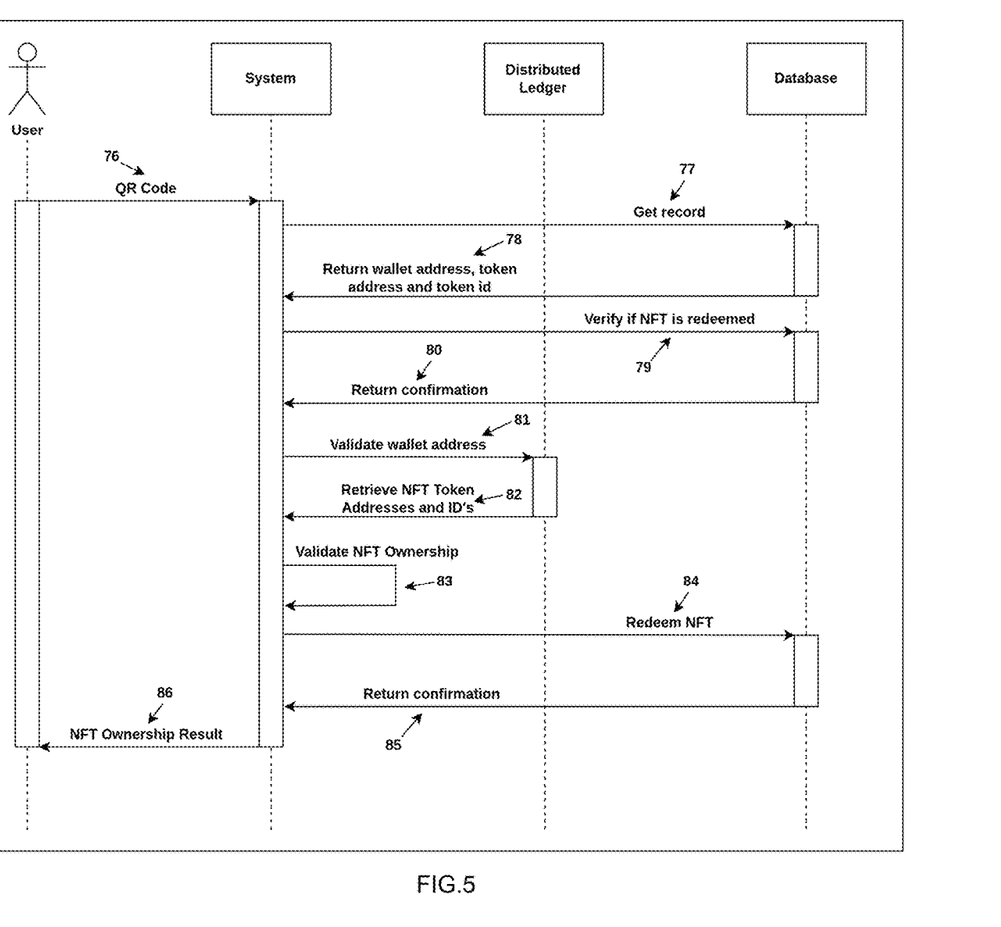
FIG. 5 Shows a sequence diagram of the user interaction with the system when presenting the unique QR Code that the system will process to authenticate the ownership of the NFT.

FIG. 5 Shows a sequence diagram of the user interaction with the ledger proxy system 2 when presenting the unique QR Code 4 that the ledger proxy system 2 will process to authenticate the ownership of the NFT. A step 76 is when the ledger proxy system 2 reads the user unique QR Code 4 from the computer device 1. A step 77 follows step 76 where the user record is searched in the database based on the unique QR Code 4 read. Once the ledger proxy system 2 finds the user record a step 78 will return the wallet address, token address and token id of the user to the ledger proxy system. A step 79 follows step 78 where the ledger proxy system 2 will validate from the database if the NFT has been redeemed previously. A step 80 follows step 79 where the confirmation is returned from the database to the ledger proxy system. Once the ledger proxy system 2 receives the database confirmation a step 81 will validate if the wallet address exists in the distributed ledger. A step 82 follows step 81 where all the user NFT addresses and IDs will be retrieved from the distributed ledger. A step 83 follows step 82 where the NFT ownership will be evaluated. Once step 83 concludes the NFT ownership evaluation a step 84 will update the record in the database to redeem the NFT. A step 85 follows step 84 where the database returns a confirmation to the ledger proxy system. A step 86 follows step 85 that will return the NFT ownership redemption result to the user.

Figure 6:
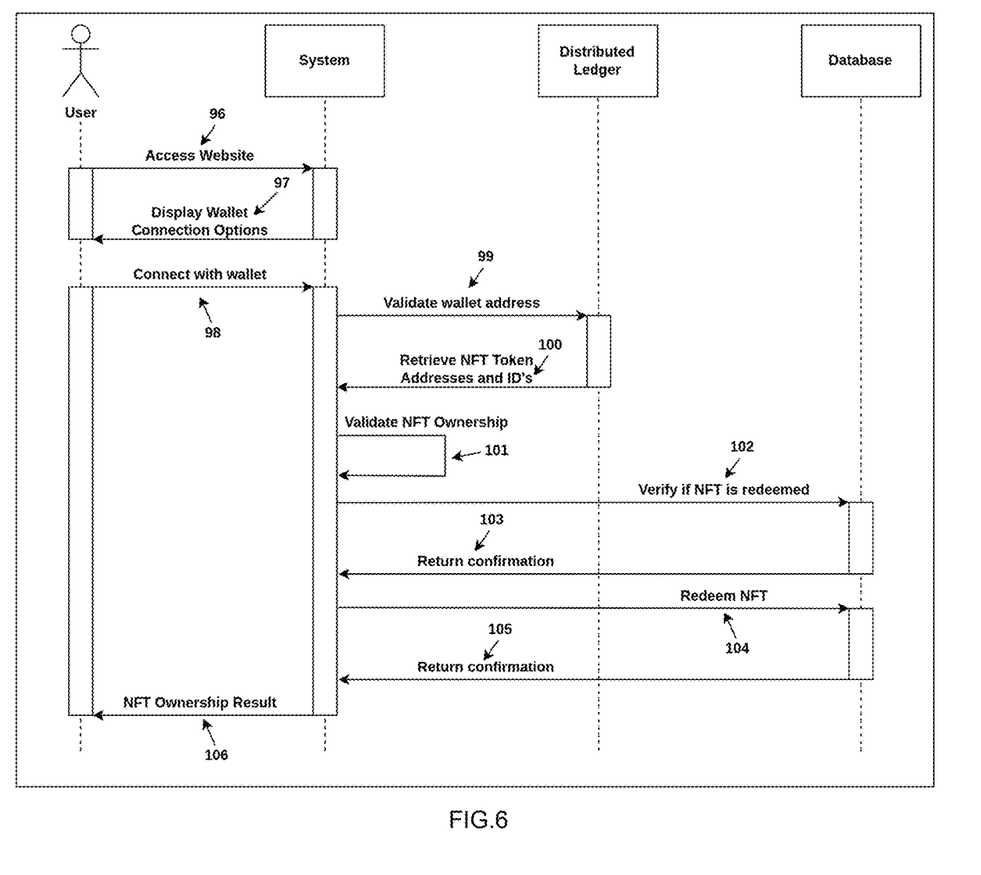
FIG. 6 Shows a sequence diagram of the user interaction with the system to authenticate the ownership of the NFT without using the unique QR code.

FIG. 6 Shows a sequence diagram of the user interaction with the ledger proxy system 2 to authenticate the ownership of the NFT without using the unique QR code 4. A step 96 is when the user first interacts with the ledger proxy system 2 connecting from the computer device 1. A step 97 follows step 96 where the ledger proxy system 2 displays multiple wallet connection options to the user. A step 98 follows step 97 after the user selects the connection option for the wallet that contains the NFT. Once the ledger proxy system 2 connects to the user's wallet a step 99 will validate if the wallet address connected exists in the distributed ledger. A step 100 follows step 99 where all the user NFT addresses and IDs will be retrieved from the distributed ledger. A step 101 follows step 100 where the NFT ownership will be evaluated. A step 102 follows step 101 where the ledger proxy system 2 will validate from the database if the NFT has been redeemed previously. A step 103 follows step 102 where the confirmation is returned from the database to the ledger proxy system 2. A step 104 follows step 103 where the ledger proxy system 2 will update the record in the database to redeem the NFT. Once step 104 finishes updating the record in the database a step 105 will return a confirmation to the ledger proxy system 2. A step 106 follows step 105 that will return the NFT ownership redemption result to the user.

Figure 7:
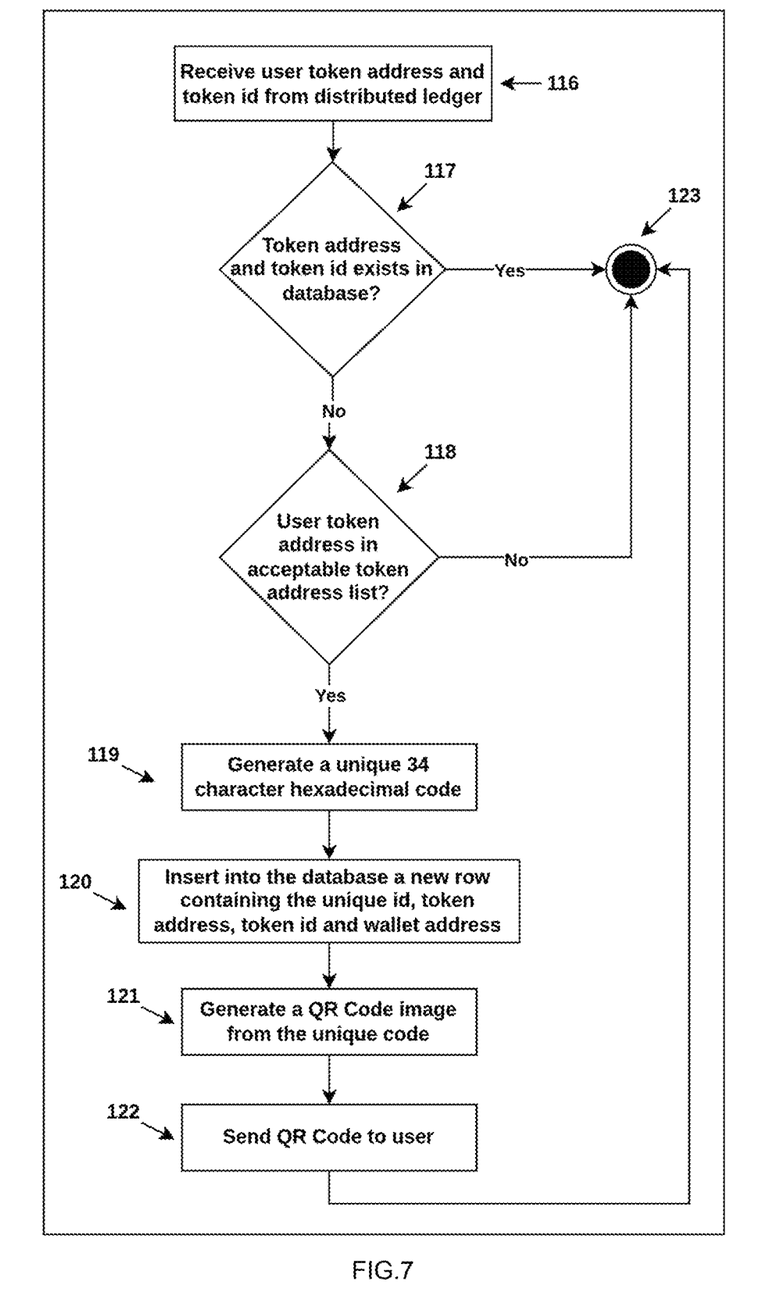
FIG. 7 Shows a flowchart of the process that generates the unique QR code that links the NFT to the user wallet address.

FIG. 7 Shows a flowchart of the process that generates the unique QR code 4 that links the NFT to the user wallet address. The process starts at a step 116 that receives the token address and token id from the distributed ledger. The step 116 is followed by a step 117 that validates if the token address and token id exists in the database. If the token address and token id does not exist in the database the process continues to a step 118 that will verify if the token address is in the acceptable token address list. If the token address is in the acceptable token address list the process continues to a step 119 that will generate a unique 34 character hexadecimal code. The step 119 is followed by a step 120 that will insert into the database a new row with the NFT values. Once step 120 is done a step 121 will generate the unique QR code 4. The step 121 is followed by a step 122 that will send the unique QR code 4 to the user. A step 123 to terminate the process occurs if the step 117 determines that the token address and token id exist in the database, or after step 122 is done.

Figure 8:
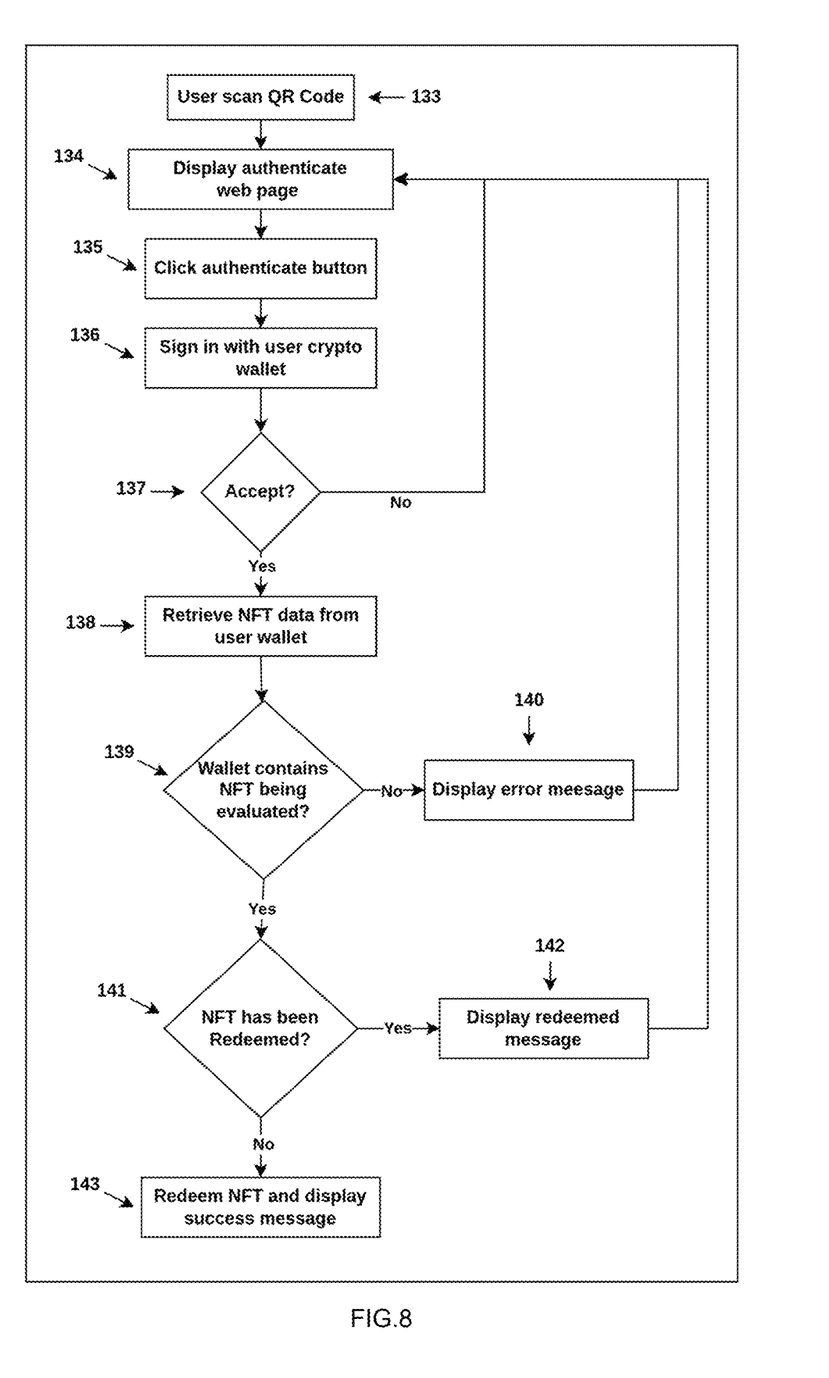
FIG. 8 Shows a flowchart of the process that authenticates the ownership of the NFT from the user interaction directly with the system without the unique QR code.

FIG. 8 Shows a flowchart of the process that authenticates the ownership of the NFT from the user interaction directly with the ledger proxy system 2 without the unique QR code 4. The process starts at a step 133 where the user scans a QR code with the computer device 1. The step 133 is followed by a step 134 that will take the user to the authenticate web page. A step 135 is when the user first interacts with the ledger proxy system 2 and the ledger proxy system 2 displays multiple wallet connection options to the user. The step 135 is followed by a step 136 where the user selects the connection option for the wallet that contains the NFT. A step 137 will validate if the user accepted the connection to the ledger proxy system 2. If the connection is not accepted by the user the process continues to the step 134. If the connection is accepted by the user the process continues to a step 138 where all the user NFT addresses and IDs will be retrieved from the distributed ledger. A step 139 follows step 138 where the NFT ownership will be evaluated. If the user does not own the NFT the process continues to a step 140 that will display an error message to the user and continue to step 134. If the user owns the NFT being evaluated the process continues to a step 141 that will validate if the NFT has been redeemed previously. If the NFT has been redeemed previously the process continues to a step 142 that will display a redeemed message to the user and continue to step 134. If the NFT has not been redeemed the process terminates in a step 143 that will redeem the NFT and display a success message.

Figure 9:
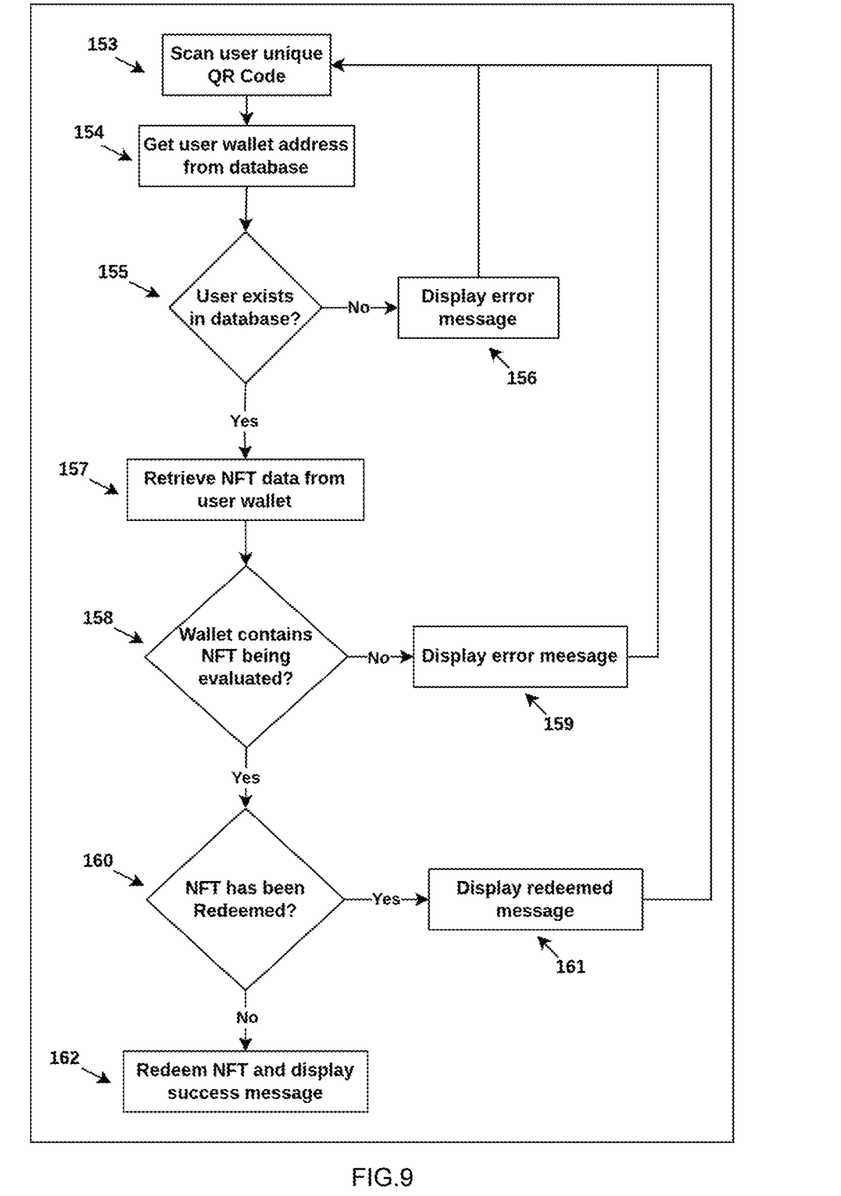
FIG. 9 Shows a flowchart of the process that authenticates the ownership of the NFT after a computer device scans the unique QR Code the system generated for the user.

FIG. 9 Shows a flowchart of the process that authenticates the ownership of the NFT when the user has the unique QR Code 4 that the ledger proxy system 2 generated. The process starts at step 153 where the computer device 1 scans the unique QR Code 4. A step 154 follows step 153 where the ledger proxy system 2 retrieves the user wallet address that is linked to the unique QR Code 4. A step 155 will validate if the user exists in the database. If the user does not exist in the database the process continues to a step 156 that will display an error message and continue to step 153. If the user exists in the database the process continues to a step 157 where all the user NFT addresses and IDs will be retrieved from the distributed ledger. A step 158 follows step 157 where the NFT ownership will be evaluated. If the user does not own the NFT the process continues to a step 159 that will display an error message to the user and continue to step 153. If the user owns the NFT being evaluated the process continues to a step 160 that will validate if the NFT has been redeemed previously. If the NFT has been redeemed previously the process continues to a step 161 that will display a redeemed message to the user and continue to step 153. If the NFT has not been redeemed the process terminates in a step 162 that will redeem the NFT and display a success message.

Figure 10:
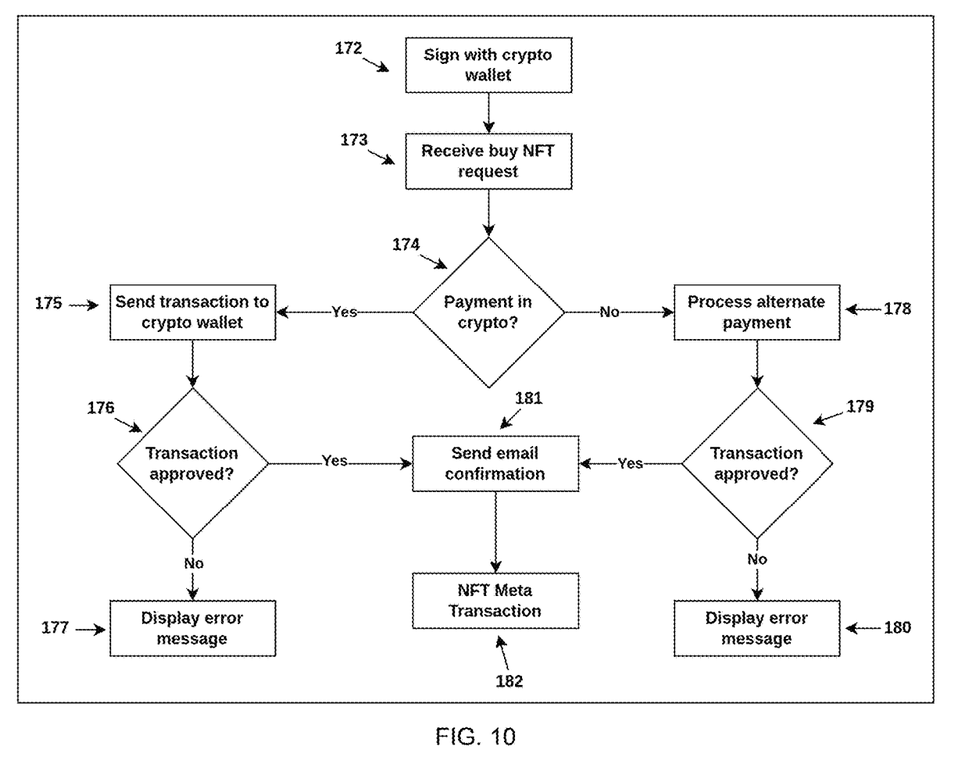
FIG. 10 Shows a flowchart of the payment system process that takes place when a user buys an NFT from the system with cryptocurrency or an alternative payment method.

FIG. 10 Shows a flowchart of the payment system process that takes place when a user buys an NFT from the system with cryptocurrency or an alternative payment method. The process starts at a step 172 where the user connects to the ledger proxy system 2 with the wallet of choosing. A step 173 follows step 172 where the ledger proxy system 2 receives the user request and user information to purchase the NFT. A step 174 will verify if the payment is in cryptocurrency or an alternate payment method. If the payment is in cryptocurrency the process continues to a step 175 where the transaction will be sent to the users wallet for confirmation. A step 176 follows step 175 where the transaction will be verified if it's approved. If the transaction is not approved the process continues to a step 177 where an error message will be displayed. If the payment is not in cryptocurrency the process continues to a step 178 that will undertake the alternate payment selected. A step 179 follows step 178 where the transaction will be verified if it's approved. If the transaction is not approved the process continues to a step 180 where an error message will be displayed. A step 181 will send an email confirmation to the user if the step 176 returns an approved transaction, or the step 179 returns an approved transaction. Once step 181 is done a step 182 will start the NFT transaction to transfer the NFT to the user and terminate the process.

Figure 11:
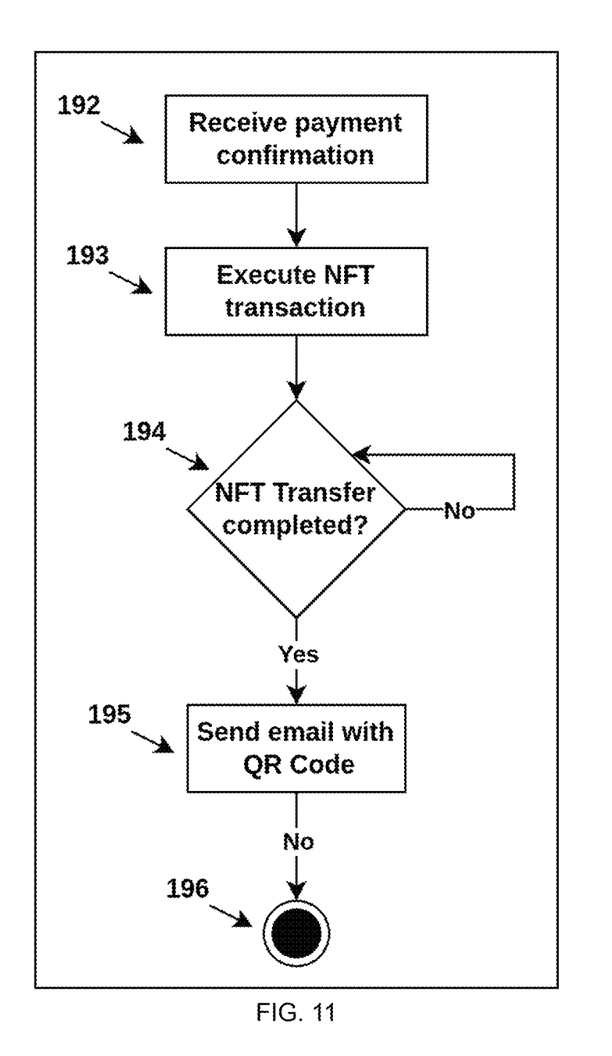
FIG. 11 Shows a flowchart of the process that transfers the NFT through the distributed ledger to the user.

FIG. 11 Shows a flowchart of the process that transfers the NFT through the distributed ledger to the user. The process starts at a step 192 where the ledger proxy system 2 receives a payment confirmation. A step 193 follows step 192 where the NFT transaction will commence to transfer the NFT to the user's connected wallet. Once step 193 is done a step 194 will validate that the NFT transfer is completed. If the NFT transfer is not completed the process continues to step 194. If the NFT transfer is completed the process continues to a step 195 where an email is sent to the user from the ledger proxy system 2 containing the unique QR code 4. A step 196 to terminate the process occurs after step 195 is completed.

The invention claimed is:

1. A method for authenticating an NFT on a distributed ledger performed by a proxy system, comprising:
   a. receiving a request to authenticate an NFT, where the request is initiated by a user interacting with the proxy system via scanning a QR Code comprising a unique hexadecimal identifier;
   b. using the unique hexadecimal identifier, retrieving the corresponding NFT metadata from the distributed ledger;
   c. verifying the authenticity of the NFT through a verification process, where:
      i. The retrieved metadata is validated against a distributed ledger record;
   d. enerating generating an authentication result indicating whether the NFT is authentic based on the verification process; and
   e. formatting and transmitting the authentication result directly to the requester.

2. A method for distributing an NFT on a distributed ledger performed by a proxy system, comprising:
   a. receiving an NFT creation request from a user, the request including metadata and ownership information, wherein the request is validated through a two step verification process comprising:
      i. confirming that a quantity of NFTs requested does not exceed an allowed threshold; and
      ii. verifying that a required payment has been received prior to NFT creation;
   b. generating the NFT on the distributed ledger, wherein:
      i. the ledger proxy system creates the NFT on behalf of the user; and
      ii. a unique hexadecimal identifier is generated for the NFT and user association;
   c. distributing the NFT to a wallet address by transferring ownership of the NFT to the recipient on the distributed ledger;
   d. generating a QR code representation of the NFT based on the unique hexadecimal identifier and transmitting it to the user upon successful NFT creation and transfer; and
   e. recording the transfer as a transaction entry in a database separate from the distributed ledger.

3. A method for authenticating an NFT on a distributed ledger performed by a proxy system, comprising:
   a. receiving a request to authenticate an NFT, the request including ownership information, where the request is initiated by a user interacting with the proxy system via a wallet connection;
   b. retrieving the corresponding NFT metadata from the distributed ledger;
   c. verifying the authenticity of the NFT through a two step verification process, comprising:
      i. validating the retrieved metadata, and
      ii. verifying that the NFT has not been redeemed;
   d. generating an authentication result indicating whether the NFT is authentic based on the two step verification process; and
   e. formatting and transmitting the authentication result directly to the requester.

* * * * *